United States Patent [19]

Grubb

[11] 4,097,402
[45] Jun. 27, 1978

[54] NUCLEAR FUEL ASSEMBLY AND PROCESS

[75] Inventor: Willard T. Grubb, Schenectady, N.Y.

[73] Assignee: General Electric Company, Schenectady, N.Y.

[21] Appl. No.: 700,736

[22] Filed: Jun. 29, 1976

[51] Int. Cl.$^2$ .............................................. G21C 3/42
[52] U.S. Cl. .............................. 252/301.1 R; 176/38; 176/69; 176/91 SP
[58] Field of Search ................... 252/301.1 R; 176/68, 176/69, 82, 91 R, 91 SP, 93 BP

[56] References Cited

U.S. PATENT DOCUMENTS

| | | | |
|---|---|---|---|
| 2,863,816 | 12/1958 | Stacy | 176/82 |
| 3,050,454 | 8/1962 | Barr et al. | 204/193.2 |
| 3,170,847 | 2/1965 | Dudek et al. | 176/71 |
| 3,427,222 | 2/1969 | Biancheria | 176/91 R |
| 3,510,545 | 5/1970 | Nishiyama | 264/0.5 |
| 3,625,821 | 12/1971 | Ricks | 176/68 |
| 3,652,745 | 3/1972 | Strazza | 264/0.5 |
| 3,969,186 | 7/1976 | Thompson et al. | 176/68 |

OTHER PUBLICATIONS

Hansen, Constitution of Binary Alloys, 2nd Ed., 1958, pp. 190–194 & 434.
Elliott, Constitution of Binary Alloys, First Supp., 1965, pp. 5 & 6.

*Primary Examiner*—Samuel W. Engle
*Assistant Examiner*—Ralph Palo
*Attorney, Agent, or Firm*—Charles T. Watts; Joseph T. Cohen

[57] ABSTRACT

Rupture of boiling water reactor nuclear fuel cladding resulting from embrittlement caused by fission product cadmium is prevented by adding the stoichiometrically equivalent amount of gold, silver or palladium to the fuel.

16 Claims, No Drawings

NUCLEAR FUEL ASSEMBLY AND PROCESS

The present invention relates generally to the art of corrosion prevention in nuclear reactors and is more particularly concerned with novel boiling water reactor nuclear fuel compositions and with a new method involving the use of gold, silver or palladium or mixtures thereof to prevent embrittlement of nuclear fuel cladding by cadmium.

CROSS REFERENCES

This invention is related to those of my following two patent applications assigned to the assignee hereof and filed of even date herewith:

Patent Application Ser. No. 700,735, filed June 29, 1976, entitled "Nuclear Fuel Assembly and Process" which discloses and claims the concept of preventing embrittlement of fuel cladding by chemically inerting fission product cadmium through the use of relatively small but effective amounts of $V_2O_4$ or $V_2O_5$ or mixtures thereof.

Patent Application Ser. No. 700,735, filed June 29, 1976, entitled "Nuclear Fuel Assembly and Process" which discloses and claims the concept of preventing embrittlement of fuel cladding by chemically inerting fission product cadmium through the use of relatively small but effective amounts of copper ferrite or copper titanate chemical displacement compounds.

BACKGROUND OF THE INVENTION

Boiling water reactor nuclear fuel in suitable compacted form is usually enclosed in corrosion-resistant, non-reactive, heat-conductive containers or cladding which in assembly may take the form of rods, tubes or plates. A plurality of fuel elements of this kind are assembled in a fixed spaced relation in a coolant flow channel, and a number of these assemblies are combined to form a reactor core capable of a self-sustained fission reaction. The core is contained in a reactor vessel through which water as a coolant is run continuously.

A prime necessity in the operation of a nuclear reactor is the containment of radioactive fission products. The cladding serves this purpose, preventing release of those products into the coolant and, in addition, preventing contact and chemical reaction between the nuclear fuel and the coolant. Common cladding materials include zirconium and its alloys, particularly Zircaloy-2 and Zircaloy-4.

During operation of a nuclear powered reactor, a fissionable atom of U-233, U-235, Pu-239 or Pu-241 undergoes a nuclear disintegration producing an average of two fission products of lower atomic weight and great kinetic energy. Some of such fission products, including iodine and bromine, have been found or considered to have corrosive effects on the cladding. Thus, cladding failure resulting from such corrosion has been observed during operation of nuclear reactors over long periods of time.

As disclosed and claimed in U.S. Pat. 3,826,734, assigned to the assignee hereof, certain additives can be incorporated in nuclear fuels to prevent corrosive attack on cladding by fission products. This result is achieved without offsetting disadvantage by chemical combination or association of the additives with deleterious fission products whereby those fission products are prevented from migrating in the nuclear fuel to reach the cladding.

SUMMARY OF THE INVENTION

This invention is based upon my discovery that cadmium, which is produced in only relatively small amounts in the fission of an atom of U-233, U-235, Pu-239, Pu-241 or the like, has a markedly deleterious effect upon common nuclear fuel cladding materials. In particular, I have found that embrittlement of zirconium alloy cladding is caused by cadmium in the temperature range of 300°–340° C. Thus, such destructive attack occurs in the presence of solid cadmium at 300° C, liquid cadmium at 340° C and cadmium dissolved in liquid cesium at any temperature in that range. Still further, the presence in nuclear fuel of the immobilizing additives of the prior art does not prevent or limit this embrittling effect of cadmium.

This invention is additionally based upon my discovery that gold, silver and palladium have the capability individually and in admixture of reacting with cadmium under normal boiling water reactor operating conditions and thereby preventing embrittlement of nuclear fuel cladding by cadmium in liquid or solid form or in solution in liquid cesium. Further, I have found that these three metals may be admixed with a nuclear fuel as a simple additive or used as a component of a multi-functional fuel additive, or they may be applied as a coating on fuel pellets or on the cladding inside surface, or distributed as a layer between fuel pellets to produce the new results of this invention. However, in whatever form and manner the additive is used for this cadmium-inerting purpose, it should be proportioned to insure that there will not be a substantial amount of cadmium free to contact and embrittle the fuel cladding. Thus, on the basis of 4000 grams of uranium contained in a typical nuclear fuel rod charge of uranium oxide fuel, which in 20,000 megawatt days will generate about 0.1 gram of cadmium, between about 0.3 and 2.0 grams of gold, or between about 0.1 and 0.6 gram of silver, or between about 0.1 and 0.8 gram of palladium should be used in accordance with this invention.

It will be understood by those skilled in the art that this invention has both process and composition aspects, the new process comprising the step of providing in contact with nuclear fuel material an amount of gold, silver or palladium cadmium-immobilizing additive effective to prevent cadmium embrittlement of nuclear reactor structural components such as fuel cladding at reactor operating temperatures.

In its composition-of-matter aspect, in general, this invention comprises an oxide composition nuclear fuel material in compacted pellet form containing an amount of gold, silver or palladium or admixture thereof effective to immobilize cadmium resulting from the nuclear fission chain reactions of the fuel material by reacting with the cadmium and thereby prevent reaction of the cadmium with the metal of reactor nuclear fuel cladding under reactor operating conditions.

DETAILED DESCRIPTION OF THE INVENTION

In the preferred practice of this invention, the cadmium-inerting metal additive is incorporated in the fuel pellet in any suitable manner as by mechanically blending the additive in powder form with the nuclear fuel material in a similar finely-divided condition. Other alternatives include introduction of the additive as a coating on fuel particles that are later pressed into fuel pellets in a fuel manufacturing process. It is also feasible, according to this invention, to apply the additive as a coating to part or all of the surface of a fuel pellet, or it may be applied as a coating on the inside surface of the cladding for contact with fuel pellets loaded therein. As indicated above, it is also contemplated that the additive in powder form can be disposed as a pellet assembly as it is loaded into cladding.

Those skilled in the art will understand that when part or all of the metal additive is to be provided in the form of a coating on nuclear fuel powder particles, or on fuel pellets, or on the inside surface of the fuel cladding, one has a choice of methods of providing that coating. Thus, the vacuum deposition technique widely employed in semiconductor production may be used, the gold, silver or palladium being vaporized in a vacuum of $10^{-3}$ to $10^{-5}$ torr to condense on the surface of the powder, pellet or cladding in the vacuum chamber. Alternatively, to avoid the necessity for a vacuum operation, the desired coating can be applied by the firing-on technique involving the application by brushing or spraying of a metal-organic solution of the selected metal to the material or surface to be coated, followed by heating in air to decompose the compound and volatilize the organic constituents, leaving the metal film in place. Whatever method is employed for this coating purpose, it will further be understood that it is not necessary to consistently obtain the new results and advantages of this invention that the films produced be continuous or nonporous. Also, as indicated above, it is likewise not necessary that the proportion or the absolute amount of metal additive incorporated in the nuclear fuel system be closely controlled, the principal consideration being that substantially all cadmium generated as a fission product in the operation of the reactor comes into contact with and is reacted with the metallic additive during reactor operation so as to obtain the new results and advantages of this invention described above.

Generally, the new and highly useful cadmium immobilization result of this invention can be achieved in accordance with relatively small amounts of gold, silver or palladium. Thus, as indicated above, 0.3 gram of gold, 0.25 gram of silver and 0.1 gram of palladium is sufficient for the present purpose in a reactor operation at 20,000 megawatt days per metric ton of uranium in a boiling water reactor fuel rod which generates 0.11 gram of cadmium. In the best practice presently contemplated, the metallic additive will be used individually rather than in admixture with another metallic additive and will be present in association with the fuel in one or the other of the several alternative ways described above in amounts between 0.6 and 1.0 gram of gold, between 0.5 and 0.7 gram of silver and between 0.1 and 0.6 gram of palladium. Appreciably less than the stoichiometric amount will leave the way open to some extent for cadmium embrittlement of cladding, while use of substantially more than the stoichiometric amount burdens the system with inert material, using space that should be occupied by fissile or fertile material.

When the additive is incorporated in the fuel elements, they may take any desired geometric form or configuration, but it is preferred that the nuclear fuel material be in the form of right cylindrical pellets which are incorporated in a tubular cladding of a zirconium alloy. The swelling of the pellets in the cladding is accommodated by providing porosity in the fuel pellet or by forming it with dished ends or axial openings or the like to accommodate such swelling.

From the foregoing description, it will be understood that this invention achieves the chemical inerting of reactive fission product cadmium through the use of metallic gold, silver or palladium additives which react with cadmium under normal nuclear reactor operating conditions to form stable compounds so that fission product cadmium is not available or free to react with or attack fuel cladding or any other reactor structural metal that it may come in contact with during reactor operation. In this manner, the additive which is effective for the purposes of this invention blocks potential cladding-fission product reaction and so increases the cladding reliability and useful life.

In a test conducted for the purpose of confirming that cadmium embrittles zirconium alloy cladding material under elevated temperature conditions, a Zircaloy-2 tensile test specimen was broken in argon at 300° C after undergoing a 75 percent reduction in cross-sectional area and with a plastic strain of about 15 percent following a maximum stress of 60,000 psi. Fracture morphology was ductile.

Then in a repetition of that test but for the presence of cadmium in contact with the test specimen, breakage occurred as a transgranular cleavage fracture with zero reduction in area and zero plastic strain at maximum stress of 40,000 psi before reaching the yield point of the specimen. Many incipient cracks were observed in the specimen on conclusion of this test.

Similar results to those of the latter test were obtained in subsequent tests performed in the same manner but at temperatures between 250° C and 350° C involving the use of solid cadmium (below 321° C), liquid cadmium (above 321° C) and cadmium dissolved in liquid cesium (at temperatures both above and below 321° C).

In testing the basic new cadmium inerting concept of this invention, copper, gold, silver, palladium, silicon, chromium, iron, nickel, aluminum, yttrium and niobium were each equilibrated with cadmium at 350° C in evacuated quartz capsules in a thermal gradient furnace in a series of tests. Either a reaction occurred or it did not; and where the test result was positive in this sense, the compounds formed were stable to relative high temperature. As indicated above, only gold, silver and palladium did so react under these conditions in this test with the apparent formation of cadmium intermetallic compounds which were stable up to 550° C in the case of palladium, 650° C in the case of silver and 1000° C (the temperature limit of the furnace) in the case of gold. No such reaction was observed in these tests of the other metals listed above.

In out-of-pile experiments performed with gold, it was found that 0.1 gram of cadmium was immobilized or gettered by 2.0 grams of gold at temperatures between 300° C and 950° C (upper limt of the test). Actually, on visual examination, it was observed that only about one-tenth of the total volume of gold powder was affected, indicating that a stoichiometric reaction of one-to-one stoichiometry had taken place.

In using gold, silver or palladium or mixtures of them in accordance with this invention to fill the gap between the nuclear fuel and the cladding of a fuel rod, the metallic material in powder form may be packed lightly in place. With the volume of that gap typically being about 14.5 cc, a gap-filling load would be about 35.0 grams, which would insure inerting of the cadmium released at all locations in the fuel rod during reactor operation.

When it is desired to provide the embrittlement protection of this invention in locations between fuel pellets, a 5-mil coating of gold, for example, may be applied to one of each pair of opposed pellet end surfaces. Thus, in a typical fuel rod assembly of 100 fuel pellets, each of 0.87 square centimeters end surface area, a total of about 1.2 grams of gold will be incorporated in the fuel rod. As indicated above, this amount will be in substantial excess of the stoichiometric equivalent of the cadmium produced in the normal useful life of the fuel rod in the typical boiling water nuclear reactor operation, but will not constitute a significant displacement of fissile or fertile material.

What I claim as new and desire to secure by Letters Patent of the United States is:

1. For use in a nuclear reactor, an oxide composition nuclear fuel material in compacted pellet form containing at least one fissionable isotope and an amount of a metallic material selected from the group consisting of gold, silver and palladium and mixtures thereof effective to immobilize substantially all cadmium resulting from nuclear fission chain reactions of the nuclear fuel material through a reaction between the said cadmium and the said metallic material and thereby prevent cadmium embrittlement of nuclear fuel cladding at reactor operation temperatures.

2. The composition of claim 1 in which the nuclear fuel material comprises compounds selected from the group consisting of uranium oxide compounds, plutonium oxide compounds, thorium oxide compounds and mixtures thereof.

3. The composition of claim 1 in which the nuclear material comprises uranium oxide compounds.

4. The composition of claim 1 in which the immobilizing additive is gold.

5. The composition of claim 1 in which the immobilizing additive is silver.

6. The composition of claim 1 in which the metallic material immobilizing additive is gold in an amount between about 0.3 and 2.0 grams per 4000 grams of oxide nuclear fuel material.

7. The composition of claim 1 in which the cadmium immobilizing additive is silver in an amount between about 0.1 and 0.6 gram per 4000 grams of oxide nuclear fuel material.

8. The composition of claim 1 in which the cadmium immobilizing additive is palladium in an amount between about 0.1 and 0.8 gram per 4000 grams of oxide nuclear fuel material.

9. The method of immobilizing fission product cadmium generated in nuclear fuel material of oxide composition in pellet form containing at least one fissionable isotope which comprises the step of providing in contact with the nuclear fuel material an amount of a metallic material selected from the group consisting of gold, silver and palladium and mixtures thereof effective to immobilize substantially the cadmium generated in the nuclear fission chain reaction of the nuclear fuel material through a reaction between the said cadmium and the said metallic material and thereby prevent cadmium embrittlement of reactor structural components at reactor operating temperatures.

10. The method of claim 9 in which the metallic material additive is mixed with and distributed through the nuclear fuel material.

11. The method of claim 9 in which the metallic material additive is disposed in contact with the pellet of nuclear fuel material.

12. The method of claim 11 in which the said additive is gold in an amount between about 0.6 and 1.0 gram per 4000 grams of oxide nuclear fuel material.

13. The method of claim 11 in which the said additive is silver in an amount between about 0.6 and 1.0 gram per 4000 grams of oxide nuclear fuel material.

14. The method of claim 11 in which the metallic material additive is a mixture of gold and silver.

15. The method of claim 9 which includes the steps of providing a reactor fuel rod, coating the inside surface of the fuel rod with said cadmium immobilizing metallic material, and introducing the pellets of nuclear fuel material into the fuel rod.

16. The method of claim 15 in which the said metallic material is palladium in an amount between about 0.1 to 0.6 gram per 4000 grams of oxide nuclear fuel material.

* * * * *